May 9, 1933. N. W. SCHROEDER ET AL 1,907,677
ESTIMATING SCALE
Filed July 1, 1931

Inventor
Norman W. Schroeder
Clifford E. Hartsing
By Owen + Owen
Attorneys

Patented May 9, 1933

1,907,677

UNITED STATES PATENT OFFICE

NORMAN W. SCHROEDER AND CLIFFORD E. HARTSING, OF TOLEDO, OHIO

ESTIMATING SCALE

Application filed July 1, 1931. Serial No. 548,148.

This invention relates to an estimating scale adapted to be used in connection with building plans for ascertaining the amount of heat radiation required for heating the various rooms or for estimating the amount of material required for any other purpose for which the scale may be designed.

The general object of the invention is to make it possible to obtain the desired figures directly without any calculation. In the preferred embodiment of the invention, by applying the scale directly to the architectural plans the desired figures may be read from the scale without even ascertaining the numerical dimensions of the rooms for which the estimate is to be made.

The specific details of the invention, and the manner of using a scale constructed in accordance with the invention, will be more particularly explained in connection with the accompanying drawing, in which—

Figure 1:
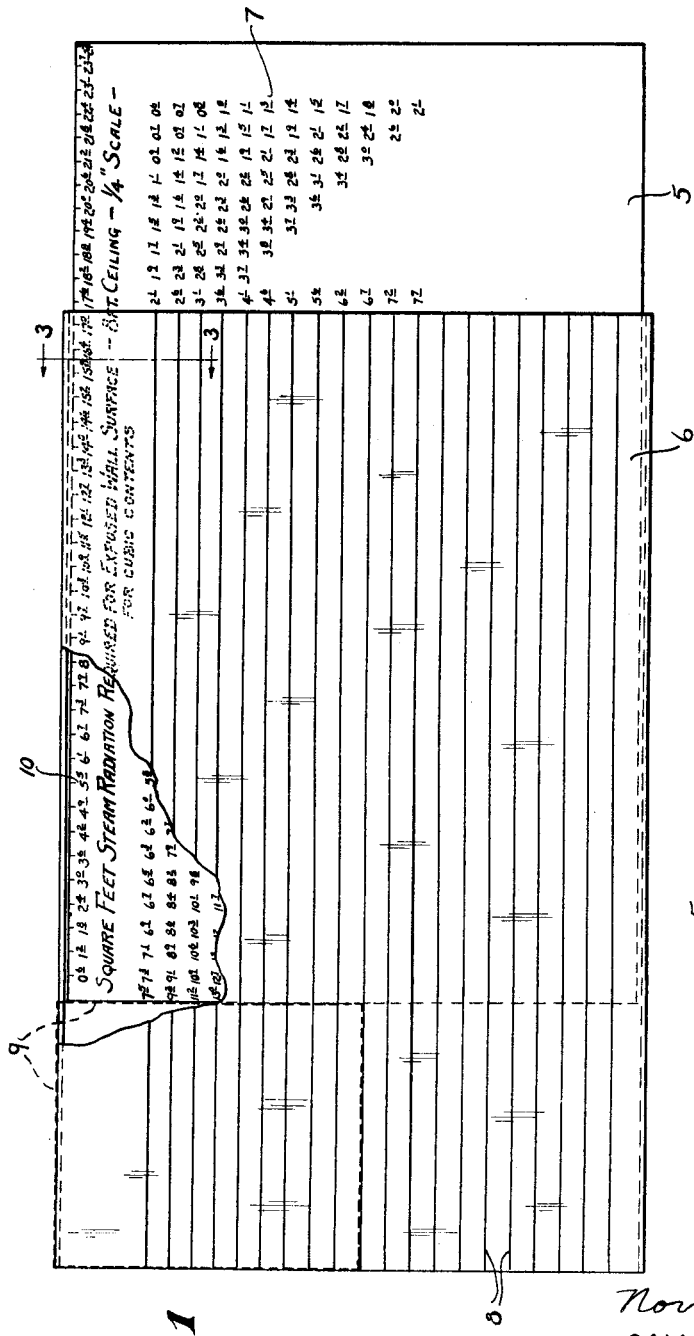
Figure 1 is a plan view of the scale as it appears in use, a portion of the envelope being broken away.
Figure 3:
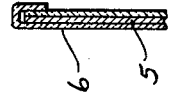
Figure 3 is a section taken on the line 3—3 of Fig. 1.

As illustrated in the drawing, the scale comprises a card or sheet 5, of rather stiff material, which is slidably mounted in an envelope 6. This envelope is preferably made of celluloid or other transparent material and is open at both ends. On the face of the sheet 5, there appears a table of figures 7 arranged in horizontal and vertical rows and representing the desired figures for rooms of various dimensions. In the present instance these figures represent the square feet of steam radiation required for rooms of various dimensions having an 8 ft. ceiling. The figures on the scale are arranged for use in connection with architectural plans, which are almost universally drawn to a scale of ¼" to the foot. The figures 7 are therefore, spaced horizontally and vertically ¼" apart and the face of the envelope 6 is provided with horizontal lines 8 similarly spaced and adapted to register with the horizontal rows of figures.

In Fig. 1, the scale is represented as being applied on the architectural plans for estimating the radiation required for the room which is indicated by the dotted lines 9. In applying the scale to the architectural plans the upper edge of the scale is superposed on the upper side of the room as indicated on the plans and the left hand end of the envelope 6 is superposed on the left hand wall of the room. The sheet 7 is then withdrawn toward the right until its left hand end registers with the right hand wall of the room. Then, following the horizontal line which registers with the lower wall of the room as represented on the plans, the last exposed figure on this line, which is represented in the drawing as 6.7, represents the square feet of steam radiation required for the room in question, without any allowance for outside exposure.

In order to estimate the allowance to be made for wall surface having an outside exposure, the upper edge of the sheet 7 is provided with a scale 10. This last mentioned scale is arranged to be laid along the exposed wall with the left hand end coinciding with the left hand end of the wall. The figure which appears at the right hand end of the exposed wall represents the additional radiation which is required on account of the exposure.

Figure 2:
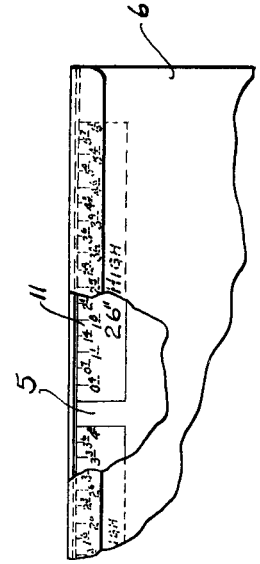
Figure 2 is a fragmentary view of the reverse side of the scale.

Additional allowance should also be made for exposed glass surface in windows or doors. The figures for this allowance may be inscribed on various scales along the edge of the reverse side of the sheet 5 as indicated at 11. For example, if the window is 26" high, the 26" window scale represented in Fig. 2 is laid along the width of the window to determine the amount of additional radiation required.

The total amount of radiation required for any given room will, therefore, be estimated as the figure obtained from the scale 7 plus the additional amount of radiation required for exposed wall surface and windows as measured on the scales 10 and 11 respectively. This estimated will be for a room of average conditions. Allowance may also be made for other factors, such as rooms facing in the direction of prevailing winds, rooms to be heated to other than average living room temperature, special construction or the like. The usual conversion tables or factors may be provided for modifying the estimate as to these extraordinary conditions and likewise tables may be provided for estimating radiation required with vapor or hot water heat.

From the foregoing description, it will be noted that our improved scale may be applied directly to the architectural plans and the basis for estimating the amount of radiation required may be read directly from the scale without any computation and without even ascertaining the dimensions of the room.

While we have shown the scale as designed for estimating steam radiation requirements, it will be obvious that the same principle may be used in a scale for estimating other requirements for finishing the building, such as plaster, paper, paint, flooring and the like. It is our purpose to include such modifications within the scope of the appended claims.

What we claim is:

1. An estimating scale for use in connection with architectural plans, said scale comprising two members, one of said members being guided for rectilinear movement with reference to the other, one of said members having figures thereon disposed in horizontal and vertical rows at distances which are equal to units on the plans, said figures being of such value and relatively so arranged that, when a room on said plans is gaged by the scale, the figure representing the required estimate may be directly ascertained by its position without ascertaining the dimensions of the room.

2. An estimating scale for use in connection with architectural plans, said scale comprising two members, one of said members being guided for rectilinear movement with reference to the other, one of said members having figures on its face disposed in horizontal and vertical rows at distances which are equal to units on the plans, said figures being of such value and relatively so arranged that each figure represents the required estimate for a room whose length and width on the plans are equal respectively to the distances of such figure from the end and side of the member on which it is inscribed.

3. An estimating scale for use in connection with architectural plans, said scale comprising a slideway, a slide guided longitudinally therein and having figures disposed on its face in horizontal and vertical rows at distances which are equal to units on the plans, each figure representing the estimating base for a room whose dimensions on the plans are equal respectively to the distances of said figure from one edge and one end of the slide.

4. An estimating scale for use in connection with architecture plans, said scale comprising a transparent envelope open at the ends, a slide having the same effective length as the envelope and guided longitudinally therein, said slide having figures disposed on its face in horizontal and vertical rows at distances which are equal to units on the plans, the figures on the slide being of such value and relatively so arranged that, when the envelope is laid with a side and end thereof in registry with the upper side and one end of a room on the plans and the slide withdrawn until its end registers with the other end of the room, the last exposed figure in alinement with the lower side of the room represents the estimating base for said room.

5. An estimating scale for use in connection with architectural plans, said scale comprising a transparent envelope open at the ends, a slide having the same effective length as the envelope and guided longitudinally therein, said slide having figures disposed on its face in horizontal and vertical rows at distances which are equal to units on the plans, each figure representing the estimating base for a room whose dimensions on the plans are equal respectively to the distance of said figure from one side and one end of the slide so that, when the envelope is laid with a side and end thereof in registry with the upper side and one end of a room on the plans and the slide withdrawn until its end registers with the other end of the room, the last exposed figure on the slide in alinement with the lower side of the room represents the estimating base for said room.

In testimony whereof we have hereunto signed our names to this specification.

NORMAN W. SCHROEDER.
CLIFFORD E. HARTSING.